Sept. 9, 1952   J. E. BUXTON   2,609,694

ENGINE STARTER GEARING
Filed Nov. 24, 1950

WITNESS:
Esther M. Stockton

INVENTOR.
James E. Buxton
BY
Clinton S. Janes
ATTORNEY

Patented Sept. 9, 1952

2,609,694

UNITED STATES PATENT OFFICE 2,609,694

ENGINE STARTER GEARING

James E. Buxton, Elmira, N. Y., assignor to Bendix Aviation Corporation, Elmira Heights, N. Y., a corporation of Delaware Application November 24, 1950, Serial No. 197,442

4 Claims. (Cl. 74—6)

The present invention relates to engine starter gearing, and more particularly to that type of disconnectable gearing in which a motor driven pinion is shifted axially by some extraneous force into and out of mesh with a gear of an engine to be started.

It is an object of the present invention to provide a novel starter gear shift which is efficient and reliable in operation, and simple and economical in construction.

It is another object to provide such a device which includes an overrunning connection permitting the drive pinion to overrun the motor quietly and freely when the engine starts, and which reengages positively but without shock if the engine stalls.

Figure 1:
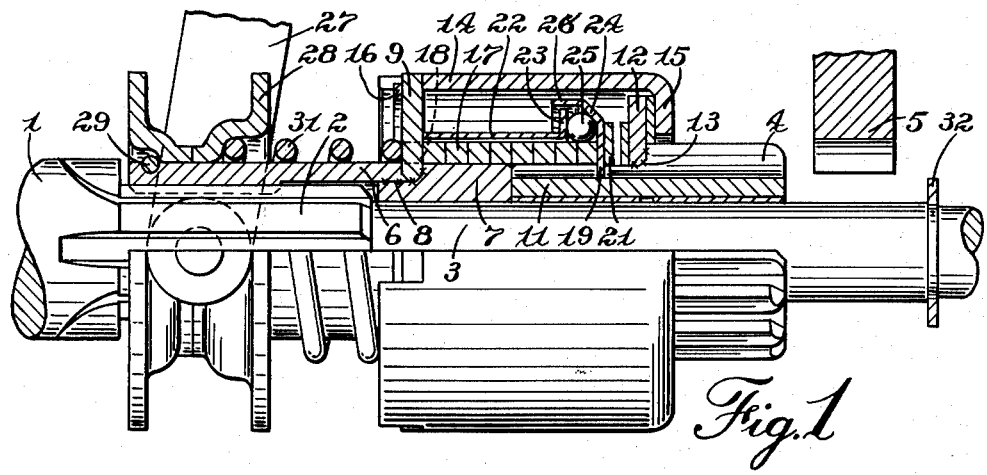
Figure 2:
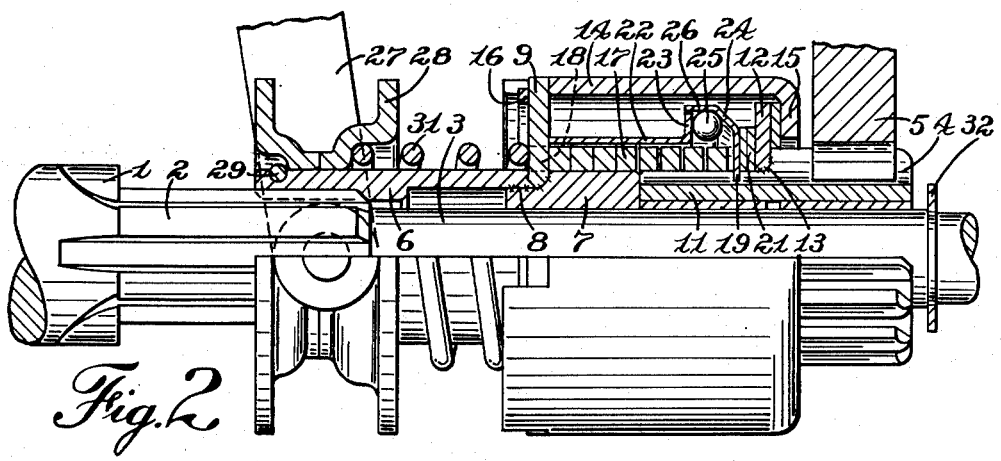

Further objects and advantages will be apparent from the following description taken in connection with the accompanying drawing in which:

Fig. 1 is a side elevation partly broken away and in section of a preferred embodiment of the invention showing the parts in idle position, and Fig. 2 is a similar view showing the parts in over running position.

In Fig. 1 of the drawing there is illustrated a power shaft 1 having a splined portion 2 and a smooth reduced portion 3 on which a pinion 4 is slidably journalled for movement into and out of mesh with an engine gear 5. A sleeve member 6 is slidably but non rotatably mounted on the splined portion 2 of the power shaft, and is provided with a cylindrical extension 7 rigidly fixed thereto as by brazing as indicated at 8 so as to be effectively integral therewith, the extension 7 being slidably journalled on the reduced portion 3 of the power shaft. A thrust ring 9 is rigidly mounted on the sleeve 6, being preferably brazed thereto at the joint with the section 7 of the sleeve.

The pinion 4 has an extended hub portion 11 having the same external diameter as the extended portion 7 of sleeve 6, and normally in abutting relation therewith. A radial flange 12 is fixed to the pinion in any suitable manner as indicated at 13, and a barrel member 14 surrounds the radial flange 12 and the thrust ring 9, and limits the separation thereof by means of the terminal flange 15 at one end of the barrel, and a lock ring 16 adjacent the other end of the barrel.

A clutch spring 17 arranged to closely encircle member 7 of sleeve 6 and the extended hub 11 of pinion 4, is arranged to wrap down and clutch these members together when torque is transmitted therethrough in the cranking direction. The driving end of the spring 17 is preferably anchored in the thrust ring 9 as indicated at 18.

In order to initiate the wrapping-down action of clutch spring 17, a thimble 19 is splined on the hub 11 of the pinion and is pressed against the end of the clutch spring 17 by a spring washer 21 located between the thimble and the pinion flange 12.

Centrifugal means for relieving the endwise pressure on the spring 17 so as to permit the pinion to freely overrun the motor shaft is provided comprising a sleeve 22 loosely surrounding the clutch spring 17, bearing at one end against the thrust ring 9 and having at its other end a radial flange 23. The thimble 19 has a flared portion 24 inclined toward the flange 23 of the sleeve 22, and a plurality of balls 25 are located between the flange 23 and the flared portion 24 so as to be operative to wedge the thimble and sleeve apart by compressing the spring 21 when the balls move outwardly by centrifugal force, as shown in Fig. 2. The thimble 19 is preferably provided with a cylindrical portion 26 for limiting the radial movement of the balls 25.

Means for shifting the sleeve 6 along the power shaft 1 is provided comprising a shift fork 27 engaging a collar 28 slidably mounted on the sleeve 6 and yieldably pressed against a lock ring 29 thereon by means of a meshing spring 31 located between the shift collar and the thrust ring 9.

In operation, starting with the parts in the positions illustrated in Fig. 1, movement of the sleeve 6 and the associated parts of the gear shift by the fork 27 causes the pinion 4 to enter into mesh with engine gear 5, which meshing position may be defined by a thrust collar 32 located on the power shaft. The power shaft is then rotated by the starting motor not illustrated, whereupon rotation is transmitted through the sleeve 6 and thrust ring 9 to the clutch spring 17. Since the free end of the clutch spring is frictionally retarded by its engagement with the thimble 19 under the pressure of spring 21, the clutch spring 17 wraps down and grips the extension 7 of sleeve 6 and hub 11 of pinion 4, clutching them together so as to transmit cranking torque. When the engine starts the acceleration of pinion 4 causes the spring 17 to unwrap therefrom and permit it to overrun. As soon as rotational speed of the balls 25 exceeds a predetermined minimum, they move outwardly so as to relieve the pressure on the end of clutch spring 17, as shown in Fig. 2, so that the spring allows the pinion to overrun freely and without the generation of heat. Should the engine not remain self-operative, the reduction in speed of the pinion permits the balls to be returned to normal position by the expansion of the spring washer 21, whereupon the clutch spring 17 is energized by the spring washer 21, whereupon the clutch spring 17 is energized by the endwise pressure of the thimble 19 thereon to cause it to again wrap down and clutch the pinion to the sleeve 6 when cranking is resumed. When the engine is successfully started, the parts are returned to normal position by the shift fork 27.

Although but one embodiment of the invention is shown and described in detail, it is understood that other embodiments are possible and that changes may be made in the design and arrangement of the parts without departing from the spirit of the invention.

I claim:

1. In an engine starter shift a power shaft, a sleeve splined thereon, means for sliding the sleeve axially along the shaft, a pinion slidably journaled on the power shaft for longitudinal movement into and out of mesh with a gear of an engine to be started, said pinion having an extended hub in abutting relation to the sleeve and of substantially the same outside diameter, a coiled clutch spring bearing on the sleeve and hub and forming the driving connection therebetween, a thrust ring mounted on the sleeve, a radial flange fixed to the pinion, a barrel member surrounding the clutch spring and limiting the separation of the thrust ring and flange, yielding means compressing the clutch spring endwise between the thrust ring and flange, and centrifugal means for compressing the yielding means and thereby relieving the pressure on the clutch spring.

2. An engine starter shift as set forth in claim 1 in which the thrust ring is rigidly fixed to the sleeve and is anchored to one end of the clutch spring, and the means for compressing the clutch spring includes a collar splined to the pinion hub and bearing on the other end of the clutch spring.

3. An engine starter shift as set forth in claim 2, in which said centrifugal means comprises a thimble loosely surrounding the clutch spring bearing at one end against the thrust ring and having a radial flange at its other end adjacent said collar; said collar having an outwardly flared portion inclined toward the flange of the thimble; and a ball located between the flange of the thimble and the flared portion of the collar operative to wedge them apart responsive to centrifugal force.

4. An engine starter shift as set forth in claim 3 in which the yielding means includes a spring washer located between the pinion flange and the splined collar and arranged to be pressed flat there-between by the centrifugal means when the pinion overruns the power shaft above a predetermined speed.

JAMES E. BUXTON.

REFERENCES CITED

The following references are of record in the file of this patent:

UNITED STATES PATENTS

| Number | Name | Date |
|---|---|---|
| 1,846,766 | Starkey et al. | Feb. 23, 1932 |
| 2,546,940 | Buxton | Mar. 27, 1951 |